(12) United States Patent
Loghmani et al.

(10) Patent No.: US 12,192,597 B2
(45) Date of Patent: Jan. 7, 2025

(54) CONTENT CREATION USING INTERACTIVE EFFECTS

(71) Applicant: Lemon Inc., Grand Cayman (KY)

(72) Inventors: Masoud Loghmani, Los Angeles, CA (US); Seong Kuan Wang, Los Angeles, CA (US); Yanli Li, Los Angeles, CA (US); Chenyu Li, Beijing (CN); Dong Zhao, Beijing (CN); Xingyi Shi, Beijing (CN); Jingjing Zhao, Beijing (CN); Nick Newberg, Los Angeles, CA (US); Lin Zhou, Beijing (CN); Guangyao Ni, Beijing (CN); Jian Huang, Los Angeles, CA (US); Chen Sun, Los Angeles, CA (US); Richard F. Tucker, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/589,673

(22) Filed: Jan. 31, 2022

(65) Prior Publication Data

US 2023/0283864 A1 Sep. 7, 2023

(51) Int. Cl.
*H04N 21/8545* (2011.01)
*H04N 21/431* (2011.01)
*H04N 21/81* (2011.01)

(52) U.S. Cl.
CPC ..... *H04N 21/8545* (2013.01); *H04N 21/4312* (2013.01); *H04N 21/8146* (2013.01)

(58) Field of Classification Search
CPC .......... H04N 21/8545; H04N 21/4312; H04N 21/8146
See application file for complete search history.

(56) References Cited

U.S. PATENT DOCUMENTS

| 2017/0180827 A1* | 6/2017 | Lewis ................ H04N 21/8583 |
| 2019/0207884 A1* | 7/2019 | Kozhemiak ............ H04L 51/10 |

(Continued)

FOREIGN PATENT DOCUMENTS

| CN | 107360160 A | 11/2017 |
| CN | 112135161 A | 12/2020 |
| CN | 113438493 A | 9/2021 |

OTHER PUBLICATIONS

International Patent Application No. PCT/SG2023/050030; Int'l Search Report and the Written Opinion; dated Aug. 2, 2023; 9 pages.

*Primary Examiner* — Kyu Chae

(74) *Attorney, Agent, or Firm* — BakerHostetler

(57) ABSTRACT

The present disclosure describes techniques for facilitating interaction with content using interactive effects. The techniques comprise receiving a video from a first computing device associated with a first user among a plurality of users. The video is generated using an interactive effect. The interactive effect comprises overlaying at least one component on at least one subset of frames of the video. The interactive effect enables the video to be interacted with other users among the plurality of users. The video is presented on a second computing device associated with a second user among the plurality of users. The video comprises information indicative of instructions on how to interact with the video. Display of an animation associated with the at least one component may be automatically caused on the second computing device in response to receiving an indication of interacting with the video by the second user.

18 Claims, 17 Drawing Sheets

(56) References Cited

U.S. PATENT DOCUMENTS

| | | | |
|---|---|---|---|
| 2020/0174757 A1* | 6/2020 | Rose | G06F 8/34 |
| 2021/0126883 A1* | 4/2021 | Choi | G06F 3/0484 |
| 2022/0166816 A1* | 5/2022 | Gaiduchenko | H04L 65/762 |

* cited by examiner

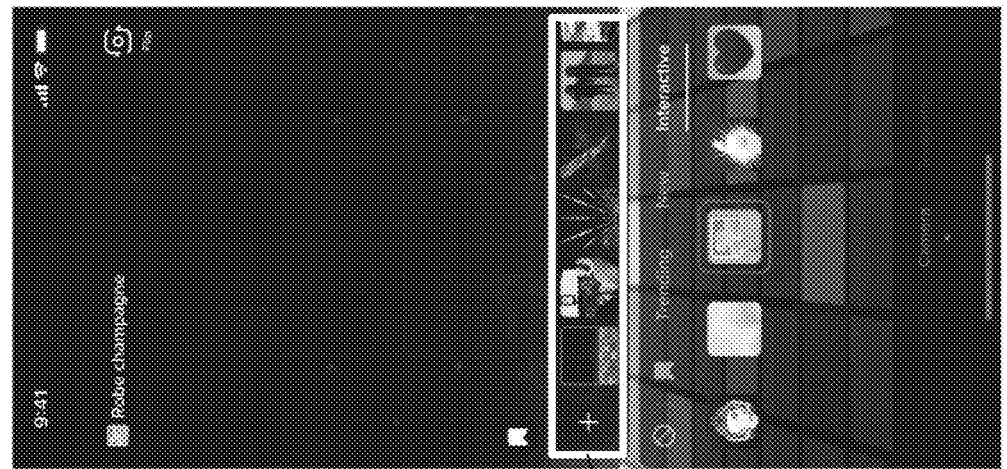
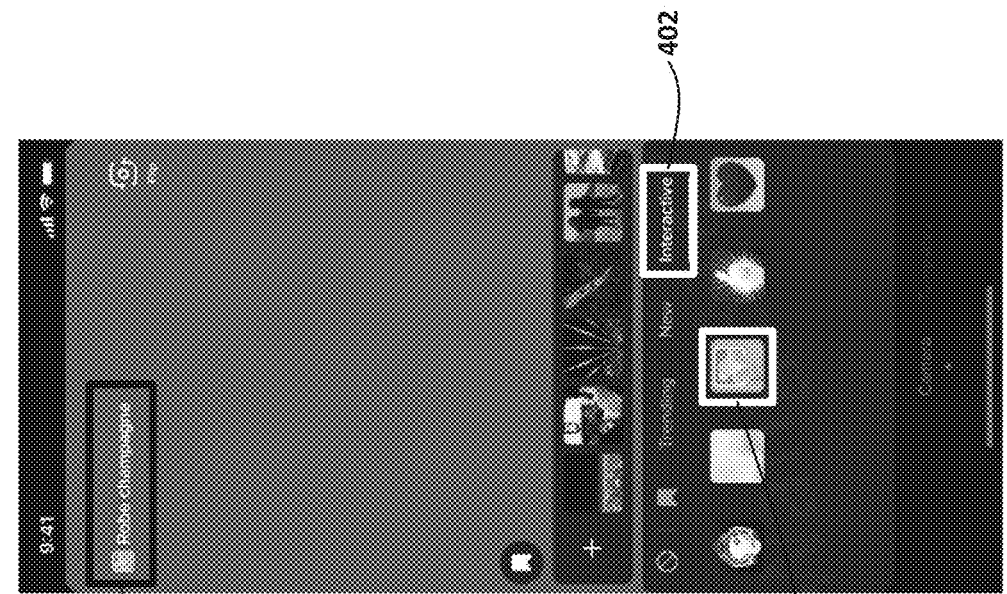
FIG. 4A
FIG. 4B

1400

Receive a video from a first computing device associated with a first user among a plurality of users, wherein the video is generated using an interactive effect, the interactive effect comprises overlaying at least one component on at least one subset of frames of the video, and the interactive effect enables the video to be interacted with other users among the plurality of users 1402

Present the video on a second computing device associated with a second user among the plurality of users, wherein the video comprises information indicative of instructions on how to interact with the video 1404

Cause to automatically display an animation associated with the at least one component on the second computing device in response to receiving an indication of interacting with the video by the second user 1406

FIG. 14

CONTENT CREATION USING INTERACTIVE EFFECTS

BACKGROUND

Communication is increasingly being conducted using Internet-based tools. The Internet-based tools may be any software or platform. Existing social media platforms, such as YouTube and Facebook, enable users to communicate with each other by sharing images, videos, and other information via static app or web pages. As communication devices, such as mobile phones, become more sophisticated, people continue to desire new ways for entertainment, social networking and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4A shows another example user interface of a content distribution application in accordance with the present disclosure.

FIG. 4B shows another example user interface of a content distribution application in accordance with the present disclosure.

FIG. 0.10 shows another example user interface of a content distribution application in accordance with the present disclosure.

FIG. 14 shows an example method for creating content, which may be performed by a user device in accordance with the present disclosure.

DETAILED DESCRIPTION OF ILLUSTRATIVE EMBODIMENTS

Content distribution platforms may provide numerous augmented reality (AR) lenses, filters, or effects for use by their users. For example, a content distribution platform may provide one or more AR lenses, filters, or effects that users of the content distribution platform can use to create photos or videos. If a user creates a video or photo using one or more AR lenses, filters, or effects, the video or photo may feature one or more AR components overlaid on the photo or overlaid on at least a subset of frames of the video. The AR components may include, for example, two-dimensional computer-generated graphics and/or three-dimensional computer-generated graphics.

However, such AR lenses, filters, or effects may not be utilized by users of the content distribution platform that want to view content without creating new content. For example, the AR lenses, filters, or effects may only be utilized when a user is creating a new video for other users to watch. In many instances, users may use the content distribution platform just to view or consume content without ever opening their camera. These users do not get to experience the AR lenses, filters, or effects or interact with the AR lenses, filters, or effects unless they perform multiple steps and open the camera. Accordingly, improvements in content creation and distribution techniques are needed.

The present disclosure describes interactive effects that may be used to create content, such as videos. The content created with these interactive effects may be distributed to and viewed by other users. The other users may view the content and interact with the content during viewing. By facilitating the creation of content using interactive effects, the techniques described in the present disclosure allow more users of a content distribution platform to experience AR lenses, filters, or effects without having to create content or open the camera. As a result, user experience on the content distribution platform is improved.

Figure 1:
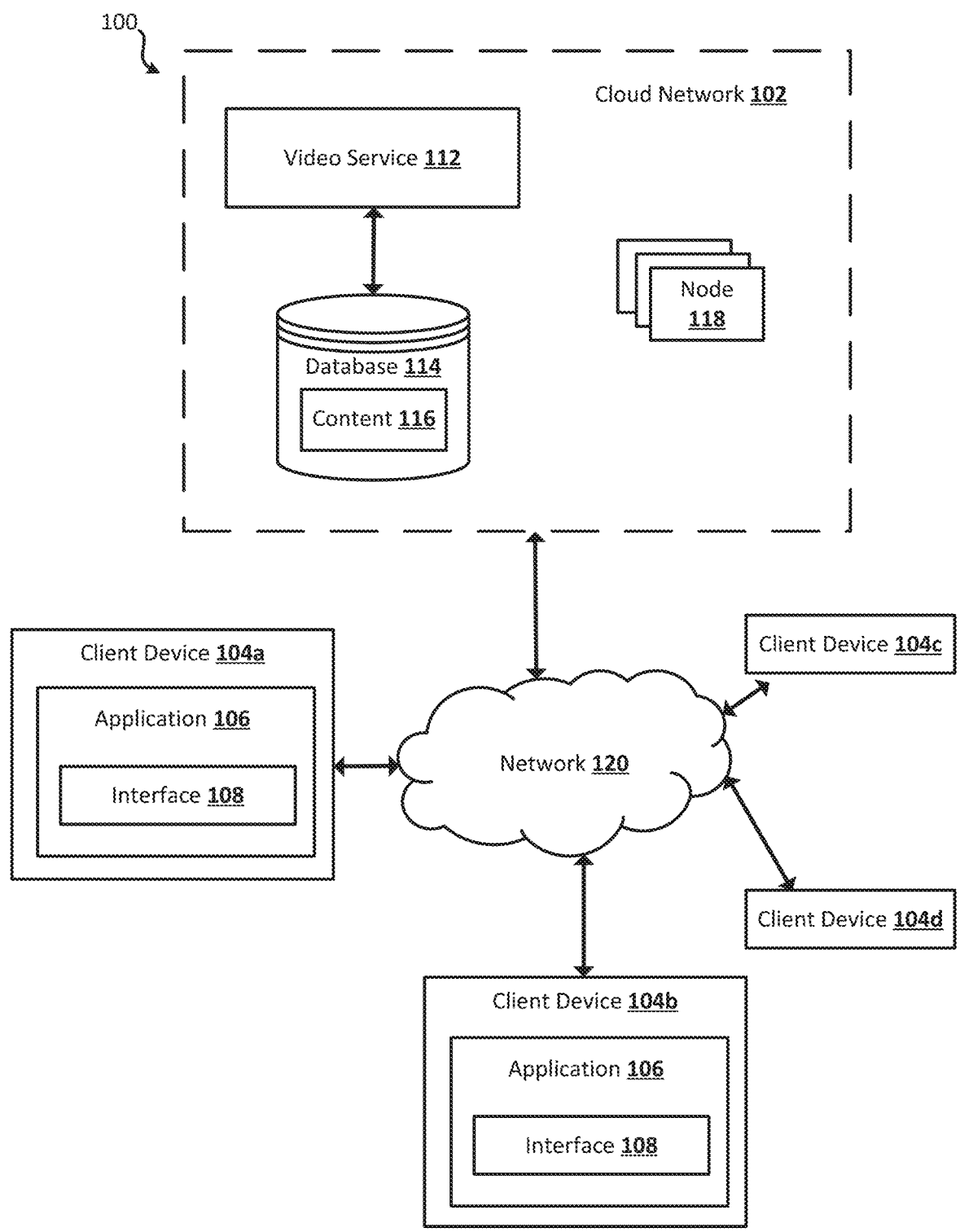
FIG. 1 shows an example system for distributing content.

FIG. 1 illustrates an example system 100 for distributing content. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a video service 112. The video service 112 may comprise a content streaming service, such as an Internet protocol video streaming service. The video service 112 may be configured to distribute content 116 via a variety of transmission techniques. The video service 112 is configured to provide the content 116, such as video, audio, textual data, a combination thereof, and/or the like. The content 116 may comprise content streams (e.g., video stream, audio stream, information stream), content files (e.g., video file, audio file, text file), and/or other data. The content 116 may be stored in a database 114. For example, the video service 112 may comprise a video sharing service, a video hosting platform, a content distribution platform, a collaborative gaming platform, and/or the like.

In an embodiment, the content 116 distributed or provided by the video service 112 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms. In other embodiments, the content 116 distributed or provided by the video service 112 comprises longer videos instead of, or in addition to, short videos.

The videos, such as short videos and/or the longer videos, may comprise a pre-recorded audio overlay, such as a clip of a pre-recorded song or audio from a television show or movie. If a video comprises a pre-recorded audio overlay, the video may feature one or more individuals lip-syncing, dancing, or otherwise moving their body along with the pre-recorded audio. For example, a video may feature an individual completing a "dance challenge" to a popular song or a video may feature two individuals participating in a lip-syncing or dancing duet. As another example, a video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other videos may not comprise a pre-recorded audio overlay. For example, these videos may feature an individual playing sports, pulling pranks, or giving advice, such as beauty and fashion advice, cooking tips, or home renovation tips.

In an embodiment, the content 116 may be output to different client devices 104 via the network 120. The content 116 may be streamed to the client devices 104. The content stream may be a stream of videos, such as short videos and/or longer videos, received from the video service 112. The plurality of client devices 104 may be configured to access the content 116 from the video service 112. In an embodiment, a client device 104 may comprise a content application 106. The content application 106 outputs (e.g., display, render, present) the content 116 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The video service 112 may be configured to receive input from users. The users may be registered as users of the video service 112 and may be users of the content application 106 operating on client devices 104. The user inputs may include short videos created by users, user comments associated with short videos, or "likes" associated with short videos. The user inputs may include connection requests and user input data, such as text data, digital image data, or user content. The connection requests may comprise requests from the client devices 104a-d to connect to the video service 112. The user input data may include information, such as short videos and/or user comments, that the users connected to the video service 112 want to share with other connected users of the video service 112.

The video service 112 may be able to receive different types of input from users using different types of client devices 104. For example, a user using the content application 106 on a first user device, such as a mobile phone or tablet, may be able to create and upload videos using the content application 106. A user using the content application 106 on a different mobile phone or tablet may also be able to view, comment on, or "like" short videos or comments written by other users. In another example, a user using the content application 106 on a smart television, laptop, desktop, or gaming device may not be able to create and upload short videos or comment on short videos using the content application 106. Instead, the user using the content application 106 on a smart television, laptop, desktop, or gaming device may only be able to use the content application 106 to view short videos, view comments left by other users, and "like" short videos.

In an embodiment, a user may use the content application 106 on a client device 104 to create a video and upload the short video to the cloud network 102. The client devices 104 may access an interface 108 of the content application 106. The interface 108 may comprise an input element. For example, the input element may be configured to allow users to create the video. To create the video, the user may give the content application 106 permission to access an image capture device, such as a camera, or a microphone of the client device 104. Using the content application 106, the user may select a duration for the video or set a speed for the video, such as "slow-motion" or "speed things up."

The user may edit the video using the content application 106. The user may add one or more texts, filters, sounds, or effects, such as beauty effects or interactive effects, to the video. To add a pre-recorded audio overlay to the video, the user may select a song or sound clip from a sound library of the content application 106. The sound library may include different songs, sound effects, or audio clips from movies, albums, and television shows. In addition to or in lieu of adding a pre-recorded audio overlay to the video, the user may use the content application 106 to add a voice-over to the video. The voice-over may be a sound recorded by the user using a microphone of the client device 104. The user can add a text overlay to the video and may use the content application 106 to specify when they want the text overlay to appear in the video. The user may assign a caption, location tag, and one or more hashtags to the video to indicate the subject matter of the video. The content application 106 may prompt the user to select a frame of the video to use as a "cover image" for the video.

After the user has created the video, the user may use the content application 106 to upload the video to the cloud network 102 and/or to save the video locally to the user device 104. When a user uploads the video to the cloud network 102, they may choose whether they want the video to be viewable by all other users of the content application 106 or viewable by only a subset of the users of the content application 106. The video service 112 may store the uploaded videos and any metadata associated with the videos in one or more databases 114.

In an embodiment, a user may use the content application 106 on a client device 104 to provide input on a video. The client devices 104 may access an interface 108 of the content application 106 that allows users to provide input associated with videos. The interface 106 may comprise an input element. For example, the input element may be configured to receive input from a user, such as comments or "likes" associated with a particular video. If the input is a comment, the content application 106 may allow a user to set an emoji associated with his or her input. The content application 106 may determine timing information for the input, such as when a user wrote a comment. The content application 106 may send the input and associated metadata to the cloud network 102. For example, the content application 106 may send a comment, an identifier of the user that wrote the comment, and the timing information for the comment to the cloud network 102. The video service 112 may store the input and associated metadata in a database 114.

The video service 112 may be configured to output the uploaded videos and user input to other users. The users may be registered as users of the video service 112 to view videos created by other users. The users may be users of the content application 106 operating on client devices 104. The content application 106 may output (display, render, present) the videos and user comments to a user associated with a client device 104. The client devices 104 may access an interface 108 of the content application 106. The interface 108 may comprise an output element. The output element may be configured to display information about different videos so that a user can select a video to view. For example, the output element may be configured to display a plurality of cover images, captions, or hashtags associated with the videos. The output element may also be configured to arrange the videos according to a category associated with each video.

In an embodiment, the user comments associated with a video may be output to other users watching the same video. For example, all users accessing a video may view comments associated with the video. The video service 112 may output the video and the associated comments simultaneously. Comments may be output by the video service 112 in real-time or near-real-time. The content application 106 may display the videos and comments in various ways on the client device 104. For example, the comments may be displayed in an overlay above the content or in an overlay beside the content. As another example, a user that wants to view other users' comments associated with a video may need to select a button in order to view the comments. The comments may be animated when displayed. For example, the comments may be shown scrolling across the video or across the overlay.

In an embodiment, the user may create the video with the content application 106 using an interactive effect selected from a plurality of interactive effects provided by the video service 112. Each interactive effect may comprise overlaying at least one component on at least one subset of frames of the video. The interactive effects may be developed with Effect SDK and LUA scripting. For example, the component may include one or more 2D or three-dimensional (3D) computer-generated graphics. For example, Helium (engine) and Lynx (framework) may be used to render any 2D or 3D UI components as a separate layer on top of the video. Through defining these UI components on this layer, ways for viewers to "interact" with another user's effect videos are pre-defined.

The interactive effect enables the video to be interacted with other users among the plurality of users. After the video has been created with the interactive effect, the video may be uploaded to the cloud network 102 and/or to save the video locally to the user device 104. The video service 112 may be configured to output the uploaded video created with the interactive effect to other users that are registered as users of the video service 112. The other users may consume the video created with the interactive effect and the other users may interact with the video. For example, if the other users interact with the video, an animation associated with the at least one overlaid component may be caused.

For example, when a video created using an interactive effect is published, it may be sent to the video service 112. The video service 112 may render a JavaScript application using Helium and Lynx on top of the video. Lynx Canvas uses Helium to draw with native rendering capabilities. When a viewer sees the video, the viewer may be asked to perform a gesture with respect to the video. If the viewer triggers the gesture, Interaction API can pick up the information and notify the client to use Lynx render additional 2D or 3D animation on top of the video using Rendering API.

In embodiments, the user may create a video with the content application 106 using a plurality of effects. The plurality of effects may include one or more interactive effects selected from a plurality of interactive effects provided by the video service 112. For example, a first portion of the video may be created using a first effect, and a second portion of the video may be created using a second, different effect. The first effect and/or the second effect may be interactive effects, which enable viewers of the video to "interact" with the video. For example, if the first effect is interactive, but the second effect is not, viewers of the video may be able to interact with the video during the first portion of the video, but not the second portion of the video. If both the first and second effects are interactive, viewers of the video may be able to interact with the video during the first portion of the video in a first manner corresponding to the first effect and may be able to interact with the video during the second portion of the video in a second manner corresponding to the second effect. A single video may be created using any number of effects, interactive or otherwise.

The plurality of computing nodes 118 may process tasks associated with the video service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

Figure 2:
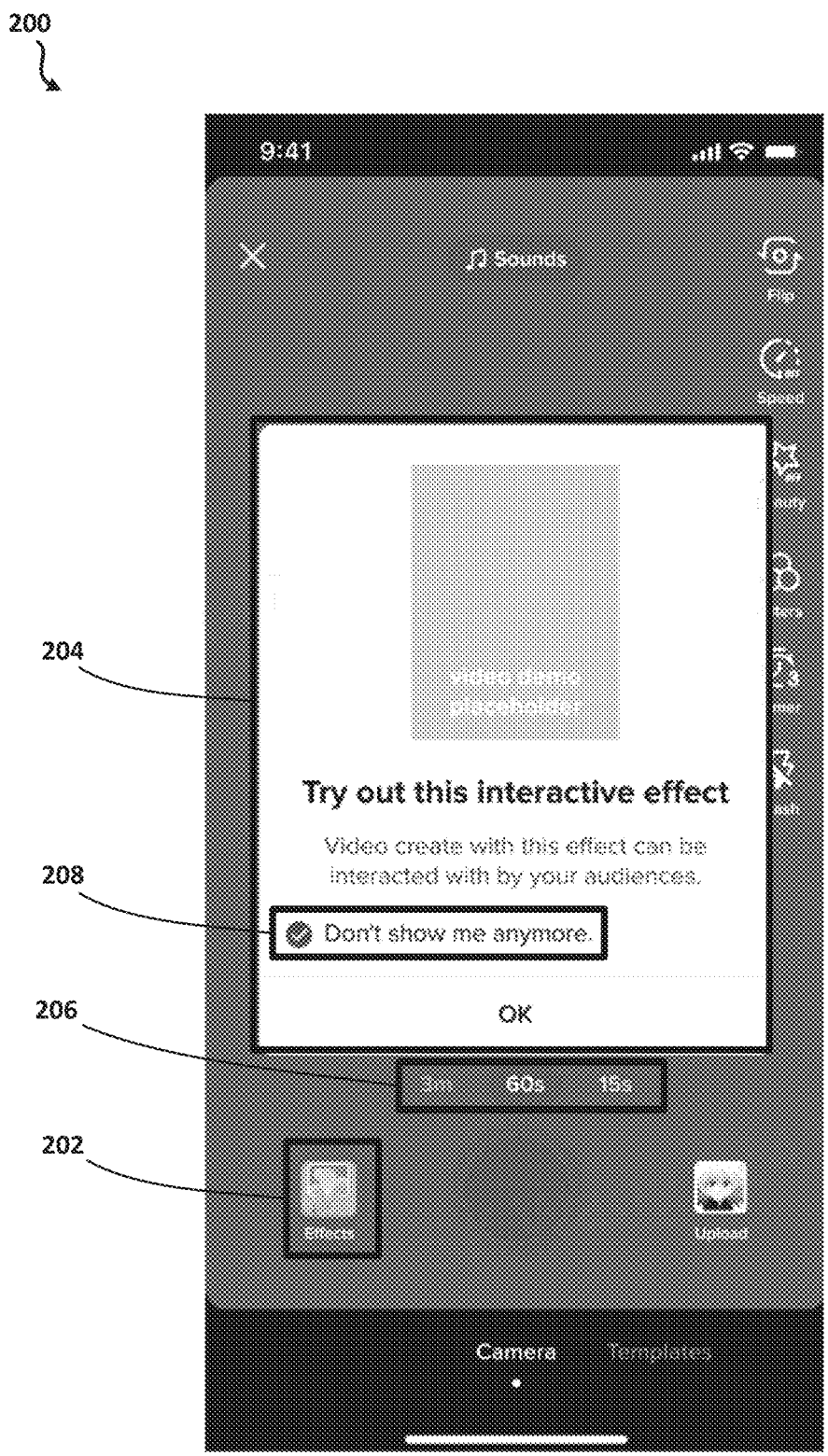
FIG. 2 shows an example user interface of a content distribution application in accordance with the present disclosure.

As discussed above, a user may use the content application 106 on a client device 104 to create a video and upload the video to the cloud network 102. In embodiments, the user can create the video using an interactive effect selected from a plurality of interactive effected provided by the video service 112. A video that is created with an interactive effect may be interacted with by viewers of the video. FIG. 2 illustrates an example user interface (UI) 200 of the content application 106. A user of a client device 104a-d can use the UI 200 to create a video using an interactive effect. For example, a user may select an effect icon 202. If the user selects the effect icon 202, the user may be able to choose an effect from a plurality of different effect options. One or more of the effect options may be interactive effects. If the user selects an interactive effect, a prompt 204 may appear on the UI 200. The prompt 204 may appear, for example, if this is the first time that that this user has created a video using an interactive effect. If the user does not want the prompt 204 to appear again when the user later creates videos using interactive effects, the user can indicate this by selecting the box 208. The box 208 may be checked by default. The prompt 204 may notify the user that the selected effect is interactive, and that videos created with the selected effect can be interacted with by viewers of the video. The user may additionally be able to select a time associated with the video by selecting a time from the box 206. For example, the user may be able to indicate that he or she wants the video to be 3 minutes long, 60 seconds long, 15 seconds long, or any other duration.

Figure 3:
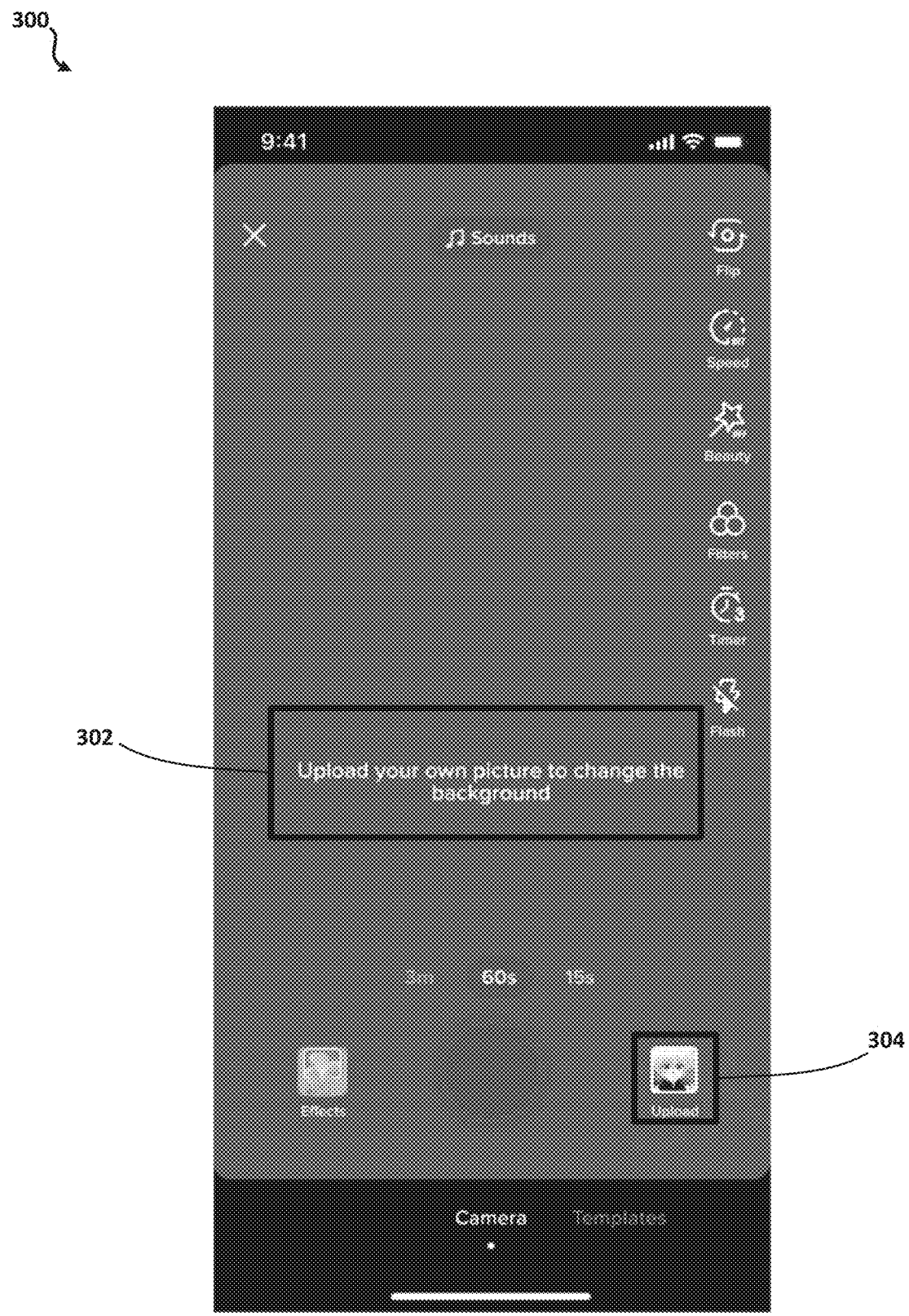
FIG. 3 shows another example user interface of a content distribution application in accordance with the present disclosure.
Figure 5B:
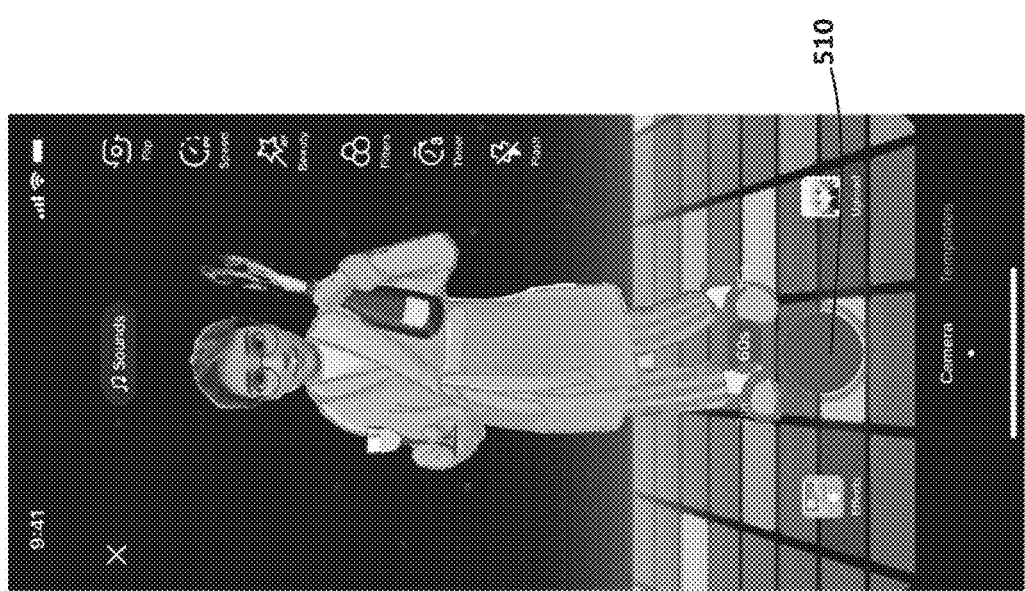
FIG. 5B shows another example user interface of a content distribution application in accordance with the present disclosure.
Figure 5A:
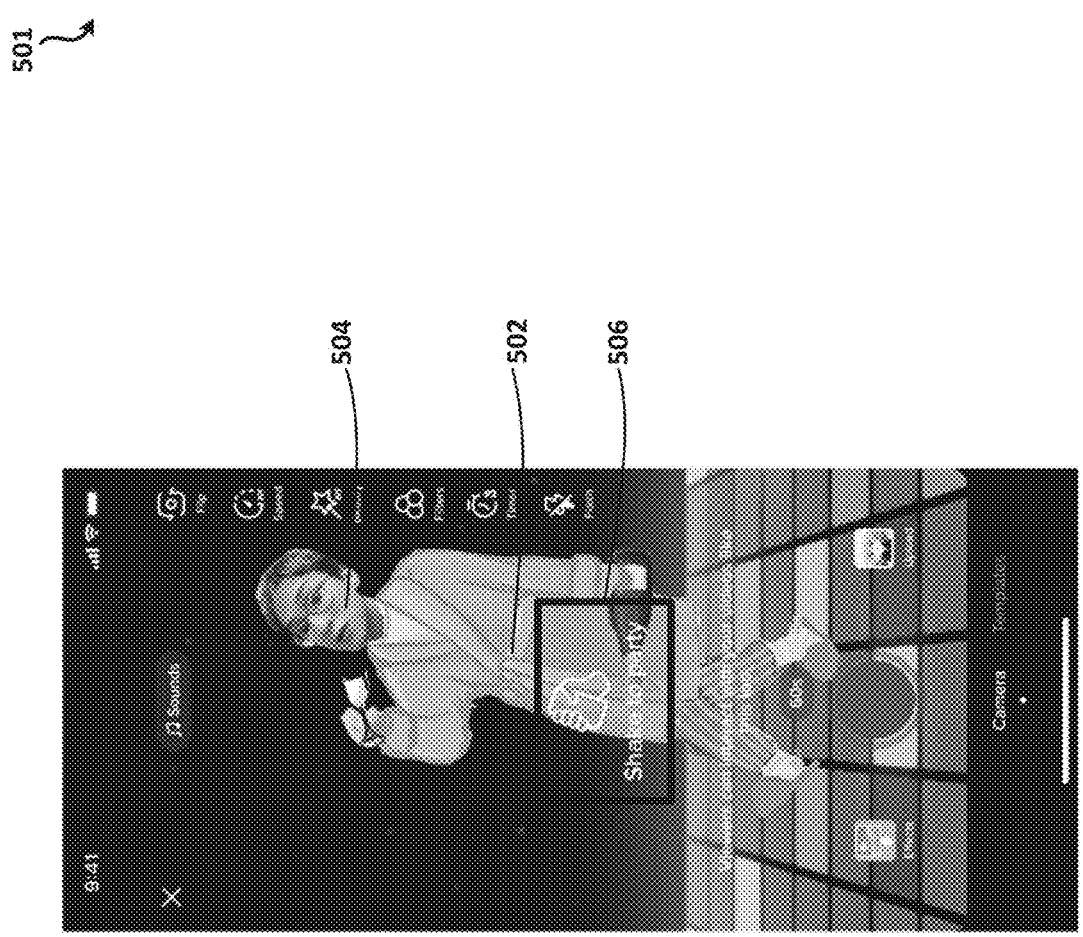
FIG. 5A shows another example user interface of a content distribution application in accordance with the present disclosure.
Figure 6B:
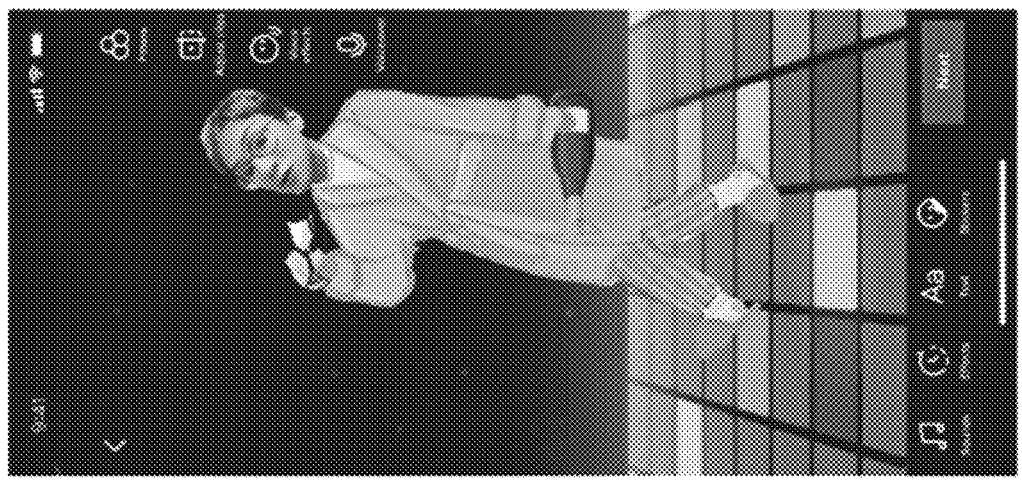
FIG. 6B shows another example user interface of a content distribution application in accordance with the present disclosure.
Figure 6A:
FIG. 6A shows another example user interface of a content distribution application in accordance with the present disclosure.

In embodiments, each interactive effect provided by the video service 112 is associated with its own default background. The user may be prompted to upload a picture or image to replace the default background. FIG. 3 illustrates an example, UI 300 of the content application 106. The UI 300 includes a prompt 302. The prompt 302 may instruct the user to upload his or her own picture or image to change the default background associated with the selected interactive effect. If the user decides that the user wants to upload his or her own picture or image to replace the default background associated with the selected interactive effect, the user can select an upload button 304. Conversely, if the user decides that the user does not want to replace the default background, the user may not want to upload his or her own picture/image. As a result, the user may not select the upload button 304.

FIGS. 4A-7B illustrate example UIs of the content application 106 that are associated with a user creating a video using a first interactive effect. As shown in FIG. 4A, the user may select an interactive effect button 402. The user may select the interactive effect button 402 if the user wants to see the various interactive effects provided by the video service 112. Various icons associated with the interactive effects provided by the video service 112 may appear on the UI 400 when the user selects the button 402. Each of the icons may correspond to a particular interactive effect provided by the video service 112. The user can select an icon 404 from the UI 400. The icon 404 corresponds to the first interactive effect. By selecting the icon 404, the user indicates that the user wants to create a video using the first interactive effect. A name 406 associated with the first interactive effect may appear on the UI 400, such as on a top portion or header of the UI 400.

As described above, in embodiments, each interactive effect provided by the video service 112 is associated with its own default background. The first interactive effect may be associated with a first default background. The user may be prompted to upload a picture or image to replace the first default background. As shown in FIG. 4B, the user may scroll through various pre-made background image options in a box 408 shown on the UI 401. The user may additionally or alternatively upload a picture or image to replace the first default background. If the user decides that the user wants to upload his or her own picture or image to replace the first default background associated with the first interactive effect, the user can select an upload button in the box 408. Conversely, if the user decides that the user does not want to replace the first default background, the user may not want to upload his or her own picture/image. As a result, the user may not select the upload button in the box 408.

In embodiments, after the background is selected (default or otherwise), a body part of the user (such as the user's face) may be imposed onto a two-dimensional (2D) or three-dimensional (3D) component that is overlaid on the at least a subset of frames of the video. For example, the two-dimensional (2D) or three-dimensional (3D) component may be a dancing body holding a bottle and/or a glass. The body part of the user may be imposed on the 2D character before the user begins shooting or filming the video. For example, as shown on the UI 500 of FIG. 5A, the 2D character can be a dancing character 502 that is holding a bottle. The user's face 504 may be imposed onto the face of the dancing character, so that it looks like the user's face is attached to the dancing body.

The client device 104 associated with the UI 500 may utilize a feed captured by a camera of the client device 104 to detect (e.g., locate) one or more parts of an object, such as one or more body parts of the user. For example, the client device 104 may utilize the feed captured by the camera to detect a head or face of the user. The one or more body parts detected by the camera may include those body parts that are imposed onto the 2D character.

In embodiments, after the body part of the user (such as the user's face 504) is imposed onto the 2D character 502, but before the user begins shooting or filming the video, the interaction associated with the first interactive effect may be simulated. For example, the interaction that viewers may have with a video that has already been created using the first interactive effect may be simulated. In this manner, the user creating the video will be able to experience the interaction and decide whether they want to create their video using the first interactive effect. Text may be displayed on the UI 500 that indicates that viewers of the video will be able to interact with the video as well. An indication 506 may appear on the UI 500. The indication 506 may include text and/or graphical instructions that instruct the user how to interact with the video. For example, the indication 506 may include text that instructs the user to shake the client device 104. The UI 500 may also include text or/and graphics that remind the user that viewers will be able to interact with the video in this same manner (e.g., by shaking the phone).

If the user follows the instructions provided by the indication 506, an animation associated with the 2D character 502 may be caused. For example, if the user shakes the client device 104, the bottle that the 2D character is holding may appear to be popped and/or sprayed as shown in the UI 501 depicted in FIG. 5B. In some embodiments, output of a sound may additionally or alternatively be caused if the user follows the instructions provided by the indication 506. The sound may correspond to the animation associated with the 2D character 502. For example, the sound may be a "cork-popping" sound that corresponds to the bottle popping on the UI 501. The user can record the video with the first interactive effect. To record the video with the first interactive effect, the user can select a start recording button 510.

The user can record the video with the first interactive effect. In embodiments, a message or instruction may appear that reminds the user to verbally instruct viewers on how to interact with the video. For example, the user may be reminded that, during recording of the video, the user should verbally instruct users to shake the phone to get a surprise. While the video is recording, the user can make various facial expressions that he or she wants to be shown on the head of the 2D character that is dancing and holding the bottle and/or glass. However, the user may not be able to reposition or scale the 2D dancing character. The user may not be able to see the interaction associated with the first interactive effect while the user is recording the video. Text may be displayed on the UI that reminds the user that viewers of the video will be able to interact with the video. When the user is done recording the video, the user can select an end recording button 602 shown on the UI 600 of FIG. 6A. After the user has ended the recording, the user can preview the video created with the first interactive effect, as shown on the UI 601 depicted in FIG. 6B. When the user previews the video created with the first interactive effect, the user may not be able to interact with the video.

As described above, after the user has created the video with the first interactive effect, the user may use the content application 106 to upload the video created with the first interactive effect to the cloud network 102 and/or to save the video locally to the user device 104. When a user uploads the video created with the first interactive effect to the cloud network 102, the user may choose whether they want the video to be viewable by all other users of the content application 106 or viewable by only a subset of the users of the content application 106. The video service 112 may store the uploaded video created with the first interactive effect and any associated metadata in one or more databases 114.

Figure 7B:
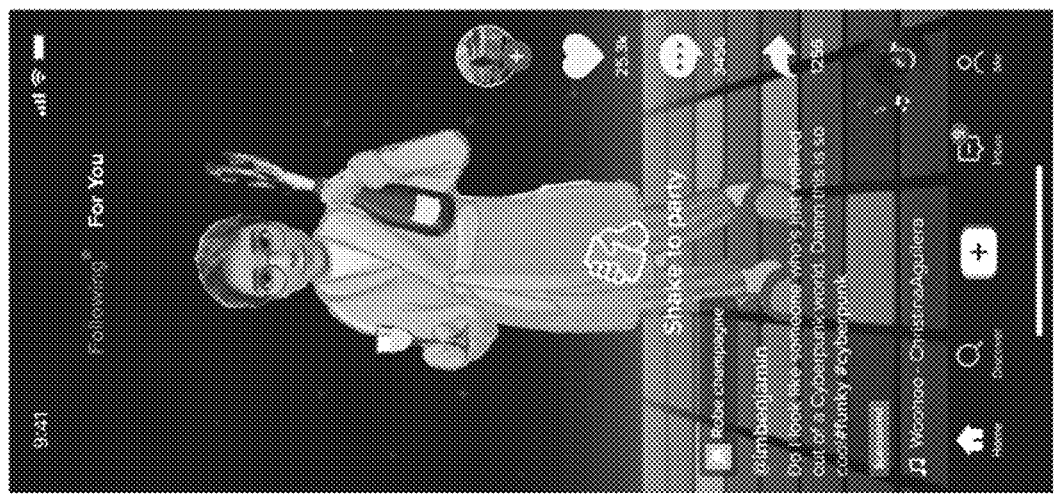
FIG. 7B shows another example user interface of a content distribution application in accordance with the present disclosure.
Figure 7A:
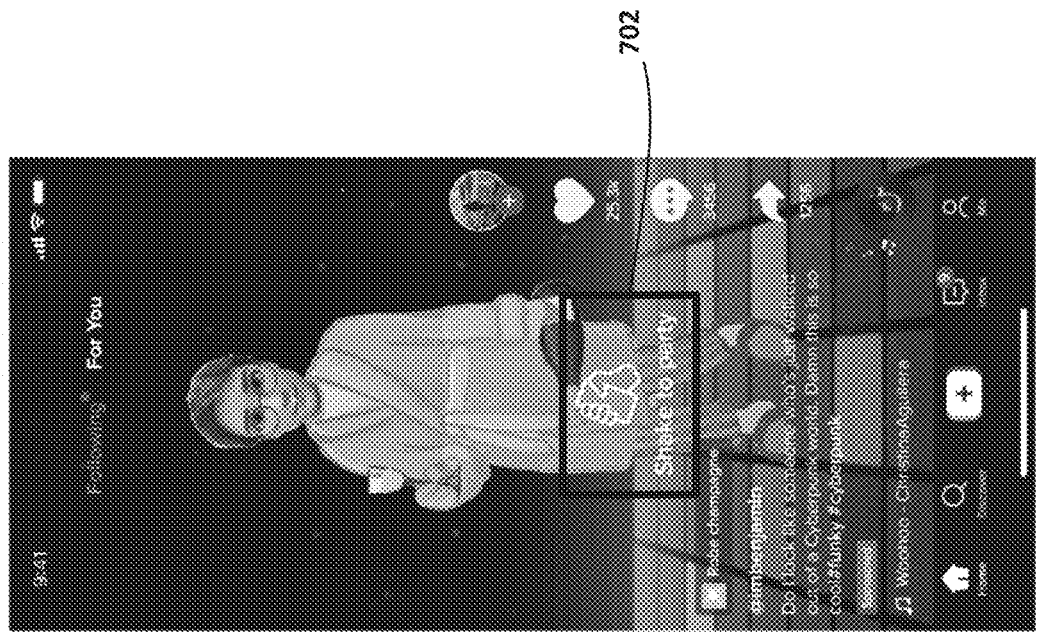
FIG. 7A shows another example user interface of a content distribution application in accordance with the present disclosure.

The video service 112 may be configured to output the uploaded video created with the first interactive effect to other users for viewing. The other users may view the video created with the first interactive effect on an interface 108 of the content application 106. FIGS. 7A-B show UIs 700-701 depicting a different user viewing the uploaded video created with the first interactive effect. While the different user is viewing the uploaded video created with the first interactive effect, a prompt 702 may appear on the UI 700. The prompt 702 may instruct the different user on how to interact with the video. For example, the prompt 702 may instruct the different user to shake the client device 104 that the different user is viewing the video on.

If the different user follows the instructions provided by the indication 702, an animation associated with the 2D character featured in the video may be caused. For example, if the different user shakes the client device 104, the bottle that the 2D character is holding may appear to be popped and/or sprayed as shown in the UI 701. In some embodiments, output of a sound may additionally or alternatively be caused if the different user follows the instructions provided by the indication 702. The sound may correspond to the animation associated with the 2D character. For example, the sound may be a "cork-popping" sound that corresponds to the bottle popping on the UI 701.

Figure 8:
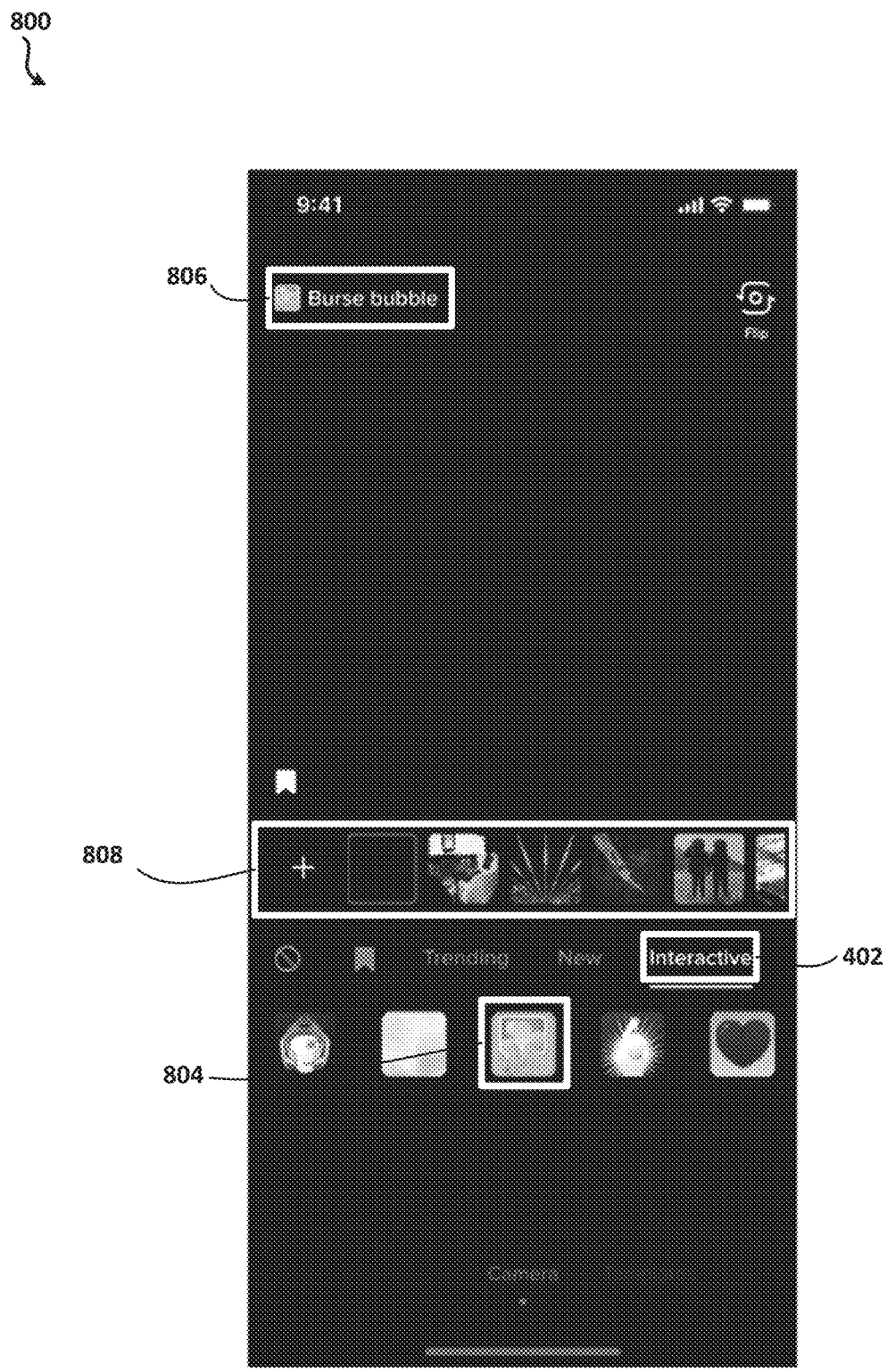
FIG. 8 shows another example user interface of a content distribution application in accordance with the present disclosure.

FIGS. 8-13 illustrate example UIs of the content application 106 that are associated with a user creating a video using a second, different interactive effect. As shown in FIG. 8, the user may select the interactive effect button 402. The user may select the interactive effect button 402 if the user wants to see the various interactive effects provided by the video service 112. Various icons associated with the interactive effects provided by the video service 112 may appear on the UI 800 when the user selects the button 402. Each of the icons may correspond to a particular interactive effect provided by the video service 112. The user can select an icon 804 from the UI 800. The icon 804 corresponds to the second interactive effect. The second interactive effect is different than the first interactive effect discussed above. By selecting the icon 804, the user indicates that the user wants to create a video using the second interactive effect. A name 806 associated with the second interactive effect may appear on the UI 800, such as on a top portion or header of the UI 800.

As described above, in embodiments, each interactive effect provided by the video service 112 is associated with its own default background. The second interactive effect may be associated with a second default background. The user may be prompted to upload a picture or image to replace the second default background. As shown in FIG. 8, the user may scroll through various pre-made background image options in a box 808 shown on the UI 800. The user may additionally or alternatively upload a picture or image to replace the second default background. If the user decides that the user wants to upload his or her own picture or image to replace the second default background associated with the second interactive effect, the user can select an upload button in the box 808. Conversely, if the user decides that the user does not want to replace the second default background, the user may not want to upload his or her own picture/image. As a result, the user may not select the upload button in the box 808.

Figure 9:
FIG. 9 shows another example user interface of a content distribution application in accordance with the present disclosure.

In embodiments, after the background is selected (default or otherwise), the user may be prompted to draw a 2D or 3D component, such as bubbles, on their screens. The 2D or 3D component may be overlaid on the at least a subset of frames of the video. As shown in FIG. 9, a prompt 902 may appear on a UI 900. The prompt 902 instructs the user to draw bubbles on his or her screen, such as by using a paint brush. The user may be prevented from drawing over existing buttons on the UI 900. During the drawing step, the user may be warned or informed that his or her video created using this second interactive effect will get covered by the bubbles. Text may be displayed on the UI 900 that informs the user that the bubbles will only appear after the user publishes the video. During the drawing step, the user may be able to erase and/or redraw one or more bubbles that the user has already drawn.

Figure 10:
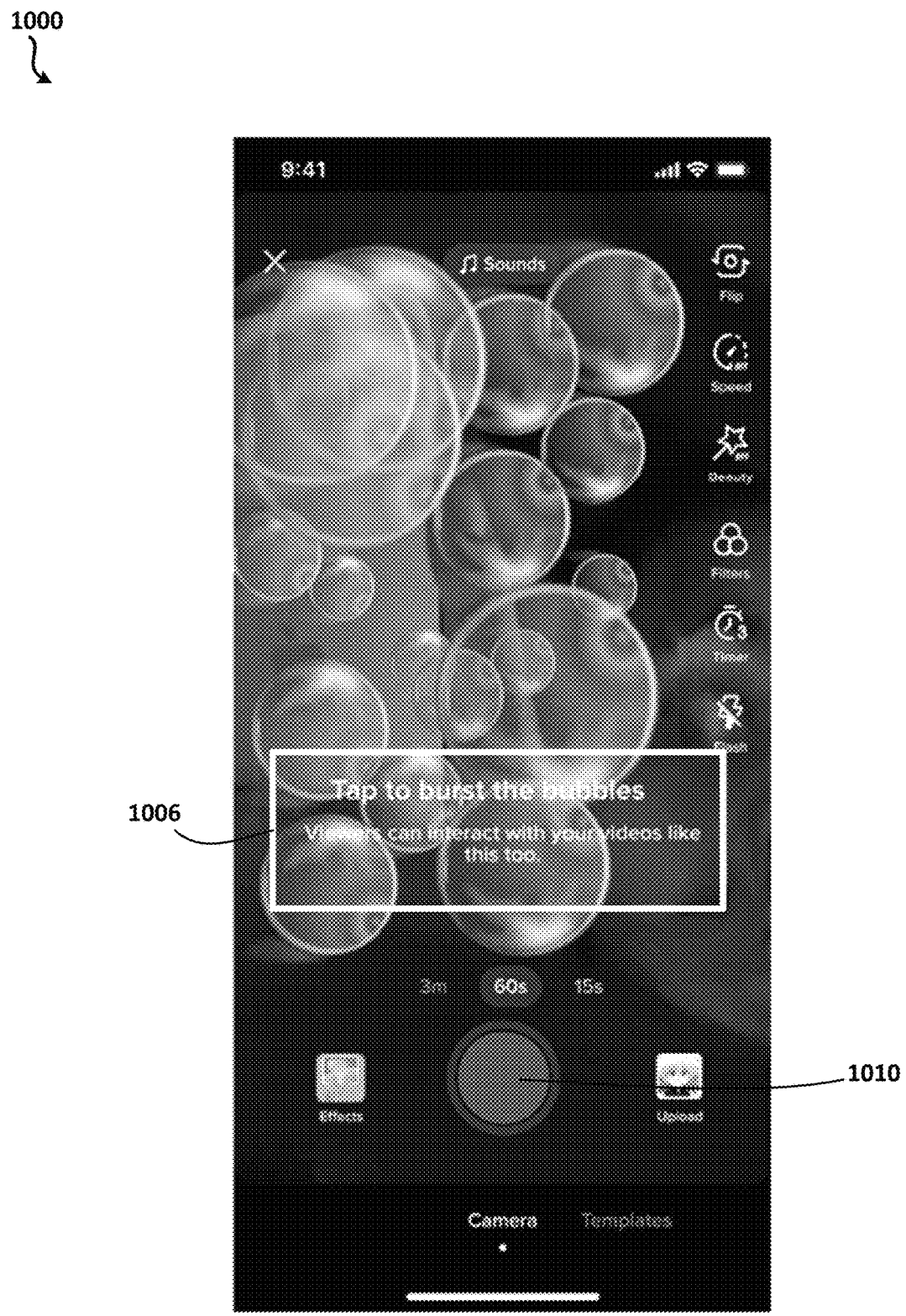

In embodiments, after the 2D or 3D component has been drawn, but before the user begins shooting or filming the video, the interaction associated with the second interactive effect may be simulated. For example, the interaction that viewers may have with a video that has already been created using the second interactive effect may be simulated. In this manner, the user creating the video will be able to experience the interaction and decide whether they want to create their video using the second interactive effect. As shown in FIG. 10, the second interactive effect may be simulated by covering up the UI 1000 with the bubbles drawn by the user. An indication 1006 may appear on the UI 1000. The indication 1006 may include text and/or graphical instructions that instruct the user how to interact with the video. For example, the indication 1006 may include text that instructs the user to tap a screen of the client device 104 to burst the bubbles that have been drawn. The UI 1000 may also include text or/and graphics that remind the user that viewers will be able to interact with the video in this same manner (e.g., by tapping to burst the bubbles).

If the user follows the instructions provided by the indication 1006, an animation associated with the 2D or 3D component may be caused. For example, if the user tap a screen of the client device 104, the bubbles that the user has drawn may appear to be popped or burst. In some embodiments, output of a sound may additionally or alternatively be caused if the user follows the instructions provided by the indication 1006. The sound may correspond to the animation associated with the 2D or 3D component. For example, the sound may be a "bubble-popping" sound that corresponds to the bubbles bursting. The user can record the video with the second interactive effect. To record the video with the second interactive effect, the user can select a start recording button 1010.

Figure 11B:
FIG. 11B shows another example user interface of a content distribution application in accordance with the present disclosure.
Figure 11A:
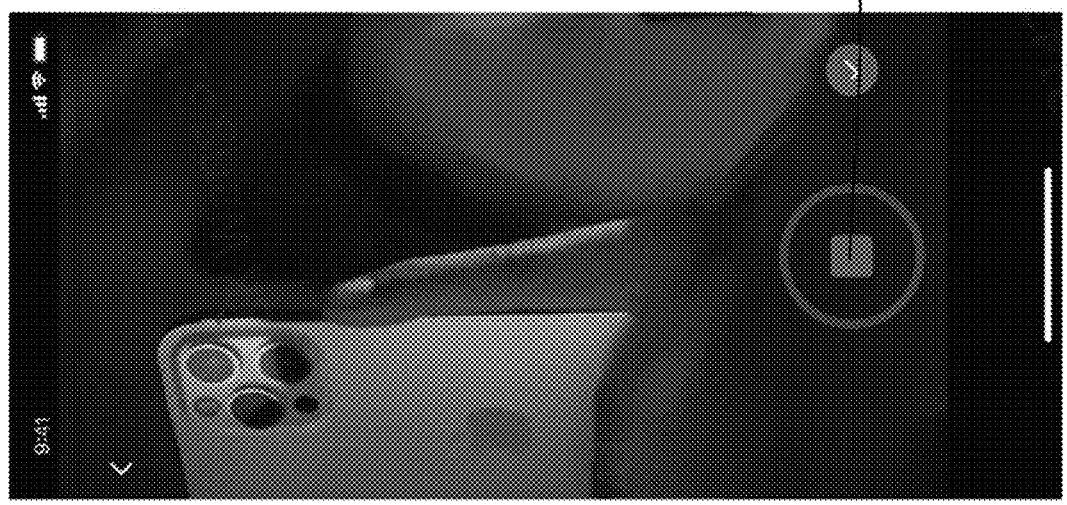
FIG. 11A shows another example user interface of a content distribution application in accordance with the present disclosure.

The user can record the video with the second interactive effect. FIG. 11A shows a UI 1100 that depicts the user recording the video. Once the user begins to record the video, the bubbles may disappear and the user can record the video with this effect as if it is a normal greenscreen effect. In embodiments, a message or instruction may appear that reminds the user to verbally instruct viewers on how to interact with the video. For example, the user may be reminded that, during recording of the video, the user should verbally instruct users to tap the screen to burst the bubbles and get a surprise. For example, the user may verbally instruct viewers to burst the bubbles to review the user's outfits in the video.

When the user is done recording the video, the user can select an end recording button 1106 shown on the UI 1100 of FIG. 11A. After the user has ended the recording, the user can preview the video created with the second interactive effect, as shown on the UI 1101 depicted in FIG. 11B. When the user previews the video created with the second interactive effect, the user may not be able to interact with the video. For example, the user may not be able to see the bubbles when the user is previewing the video.

As described above, after the user has created the video with the second interactive effect, the user may use the content application 106 to upload the video created with the second interactive effect to the cloud network 102 and/or to save the video locally to the user device 104. When a user uploads the video created with the second interactive effect to the cloud network 102, the user may choose whether they want the video to be viewable by all other users of the content application 106 or viewable by only a subset of the users of the content application 106. The video service 112 may store the uploaded video created with the second interactive effect and any associated metadata in one or more databases 114.

Figure 12B:
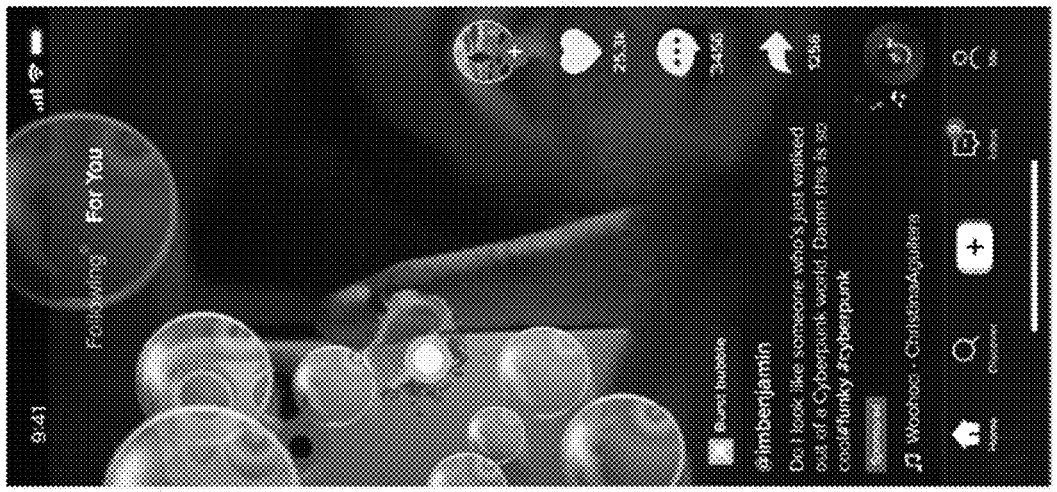
FIG. 12B shows another example user interface of a content distribution application in accordance with the present disclosure.
Figure 12A:
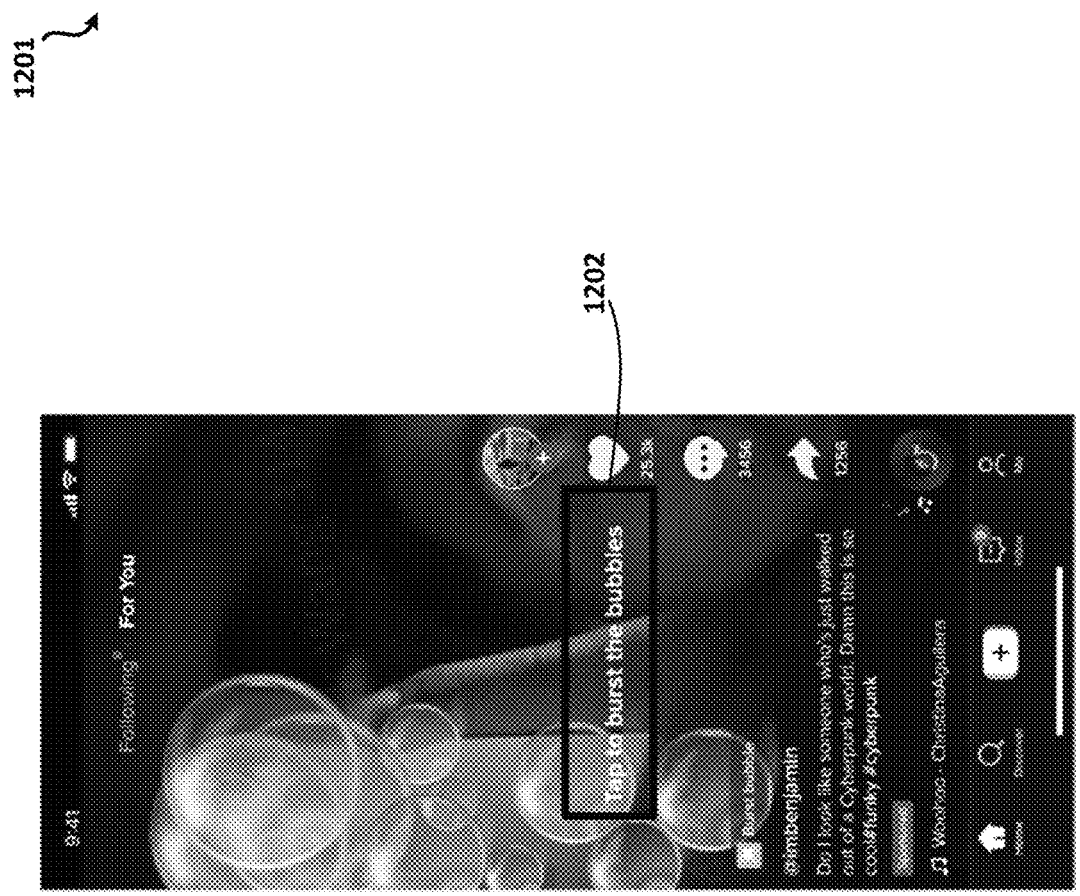
FIG. 12A shows another example user interface of a content distribution application in accordance with the present disclosure.

The video service 112 may be configured to output the uploaded video created with the second interactive effect to other users for viewing. The other users may view the video created with the second interactive effect on an interface 108 of the content application 106. FIGS. 12A-B show UIs 1200-1201 depicting a different user viewing the uploaded video created with the second interactive effect. While the different user is viewing the uploaded video created with the second interactive effect, a prompt 1202 may appear on the UI 1200. The prompt 1202 may instruct the different user on how to interact with the video. For example, the prompt 1202 may instruct the different user to tap the screen of the client device 104 that the different user is viewing the video on to burst the bubbles.

If the different user follows the instructions provided by the indication 1202, an animation associated with the 2D or 3D components featured in the video may be caused. For example, if the different user taps the screen of the client device 104, the bubbles may appear to be popped or burst as shown in the UI 1201. In some embodiments, output of a sound may additionally or alternatively be caused if the different user follows the instructions provided by the indication 1202. The sound may correspond to the animation associated with the 2D or 3D component. For example, the sound may be a "bubble-popping" sound that corresponds to the bubble bursting on the UI 1201.

Figure 13:
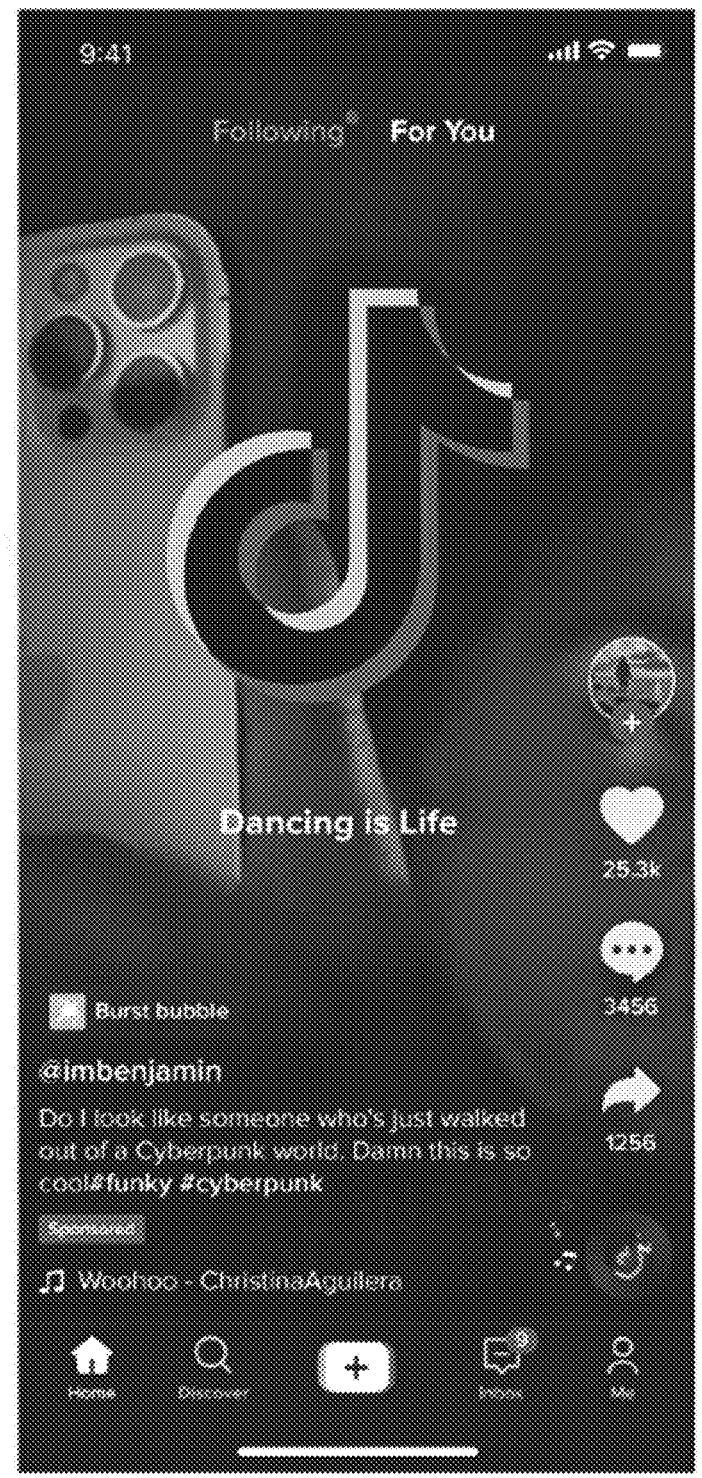
FIG. 13 shows another example user interface of a content distribution application in accordance with the present disclosure.

In embodiments, the different user must tap on the bubbles in order to burst them. If the different user taps on the screen a predetermined number of times (e.g., three times), all of the bubbles may automatically burst and float upwards on the UI 1202. When the bubbles are floating up, a predetermined image and/or a predetermined message may be displayed. For example, FIG. 13 shows a UI 1300 depicting an image 1302 that is displayed after the bubbles have floated off screen. The image 1302 may be a logo, or any other image. A message 1304 may additionally or alternatively be displayed.

FIG. 14 illustrates an example process 1400 performed by the video service (e.g., video service 112). The video service 112 may perform the process 1400 to increase user interaction with distributed content. Although depicted as a sequence of operations in FIG. 14, those of ordinary skill in the art will appreciate that various embodiments may add, remove, reorder, or modify the depicted operations.

At 1402, a video may be received from a first computing device associated with a first user among a plurality of users. The plurality of users may, for example, be registered users of the video service 112. The received video may have been generated using an interactive effect. For example, the first user may have created the video using the first or second interactive effects described above with regard to FIGS. 4A-13. The interactive effect may comprise overlaying at least one component on at least one subset of frames of the video. The at least one component may include at least one of a two-dimensional computer-generated graphic or a three-dimensional computer-generated graphic. For example, the at least one component may include the dancing character holding the bottle and glass and/or the bubbles described above. The interactive effect enables the video to be interacted with other users among the plurality of users.

At 1404, the video may be presented on a second computing device associated with a second user among the plurality of users. For example, output of the video may be caused via the second computing device. The second user may consume or view the video on the second computing device. The video can comprise information indicative of instructions on how to interact with the video. For example, presenting the video on the second computing device may comprise outputting text on an interface of the second computing device. The text may include instructions as to how the second user can interact with the video. For example, the text may instruct the second user to shake or rotated the second computing device. As another example, the text may instruct the second user to perform at least one user gesture (e.g., tap, swipe, click) on an interface of the second computing device.

At 1406, display of an animation associated with the at least one component on the second computing device may be automatically caused in response to an indication of interacting with the video by the second user being received. For example, if the second user follows the instructions (shakes or rotates the second computing device, or performs at least one user gesture), an animation associated with the at least one component may be caused. For example, as described above with regard to FIG. 7B, if the second user shakes the second computing device, the bottle that the 2D character is holding may appear to be popped and/or sprayed. As another example, as described above with regard to FIG. 12B, if the second user taps the screen of the second computing device, the bubbles may appear to be popped or burst.

The second user may, in response to viewing the video, want to create his or her own video using the interactive effect. The second user may create a new video using the interactive effect, and upload the new video, such as to the video service 112, for distribution to other users of the video service 112. The video service 112 may receive the new video from a second computing device associated with the second user and present the new video to other users of the video service 112. For example, the new video may be presented on a third computing device associated with a third user among the plurality of users. The second video may comprise information indicative of instructions on how to interact with the second video.

Figure 15:
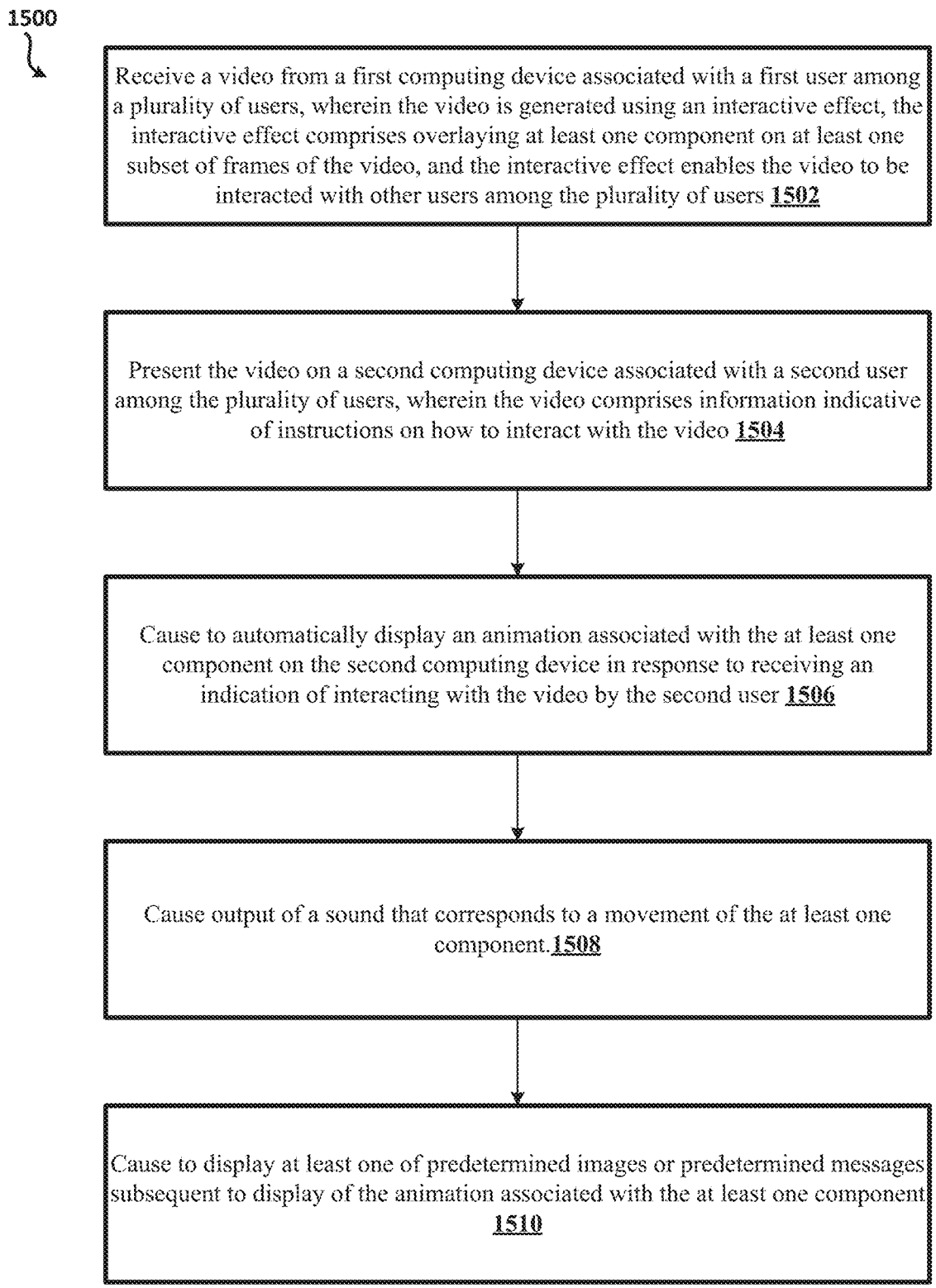
FIG. 15 shows another example method for creating content, which may be performed by a user device in accordance with the present disclosure.

FIG. 15 illustrates an example process 1500 performed by the video service (e.g., video service 112). The video service 112 may perform the process 1500 to increase user interaction with distributed content. Although depicted as a sequence of operations in FIG. 15, those of ordinary skill in the art will appreciate that various embodiments may add, remove, reorder, or modify the depicted operations.

At 1502, a video may be received from a first computing device associated with a first user among a plurality of users. The plurality of users may, for example, be registered users of the video service 112. The received video may have been generated using an interactive effect. For example, the first user may have created the video using the first or second interactive effects described above with regard to FIGS. 4A-13. The interactive effect may comprise overlaying at least one component on at least one subset of frames of the video. The at least one component may include at least one of a two-dimensional computer-generated graphic or a three-dimensional computer-generated graphic. For example, the at least one component may include the dancing character holding the bottle and glass and/or the bubbles described above. The interactive effect enables the video to be interacted with other users among the plurality of users.

At 1504, the video may be presented on a second computing device associated with a second user among the plurality of users. For example, output of the video may be caused via the second computing device. The second user may consume or view the video on the second computing device. The video can comprise information indicative of instructions on how to interact with the video. For example, presenting the video on the second computing device may comprise outputting text on an interface of the second computing device. The text may include instructions as to how the second user can interact with the video. For example, the text may instruct the second user to shake or rotated the second computing device. As another example, the text may instruct the second user to perform at least one user gesture (e.g., tap, swipe, click) on an interface of the second computing device.

At 1506, display of an animation associated with the at least one component on the second computing device may be automatically caused in response to an indication of interacting with the video by the second user being received. For example, if the second user follows the instructions (shakes or rotates the second computing device, or performs at least one user gesture), an animation associated with the at least one component may be caused. For example, as described above with regard to FIG. 7B, if the second user shakes the second computing device, the bottle that the 2D character is holding may appear to be popped and/or sprayed. As another example, as described above with regard to FIG. 12B, if the second user taps the screen of the second computing device, the bubbles may appear to be popped or burst.

At 1508, output of a sound that corresponds to a movement of the at least one component may be caused. For example, as described above with regard to FIG. 7B, the sound may correspond to the animation associated with the 2D character 502. For example, the sound may be a "cork-popping" sound that corresponds to the bottle popping. As another example, as described above with regard to FIG. 12B, the sound may correspond to the animation associated with the bubbles. For example, the sound may be a "bubble-popping" sound that corresponds to the bubble bursting. At 1510, display of at least one of predetermined images or predetermined messages may be caused subsequent to display of the animation associated with the at least one component. For example, as described above with regard to FIG. 13, the image may be a logo, or any other image. A message may additionally or alternatively be displayed.

Figure 16:
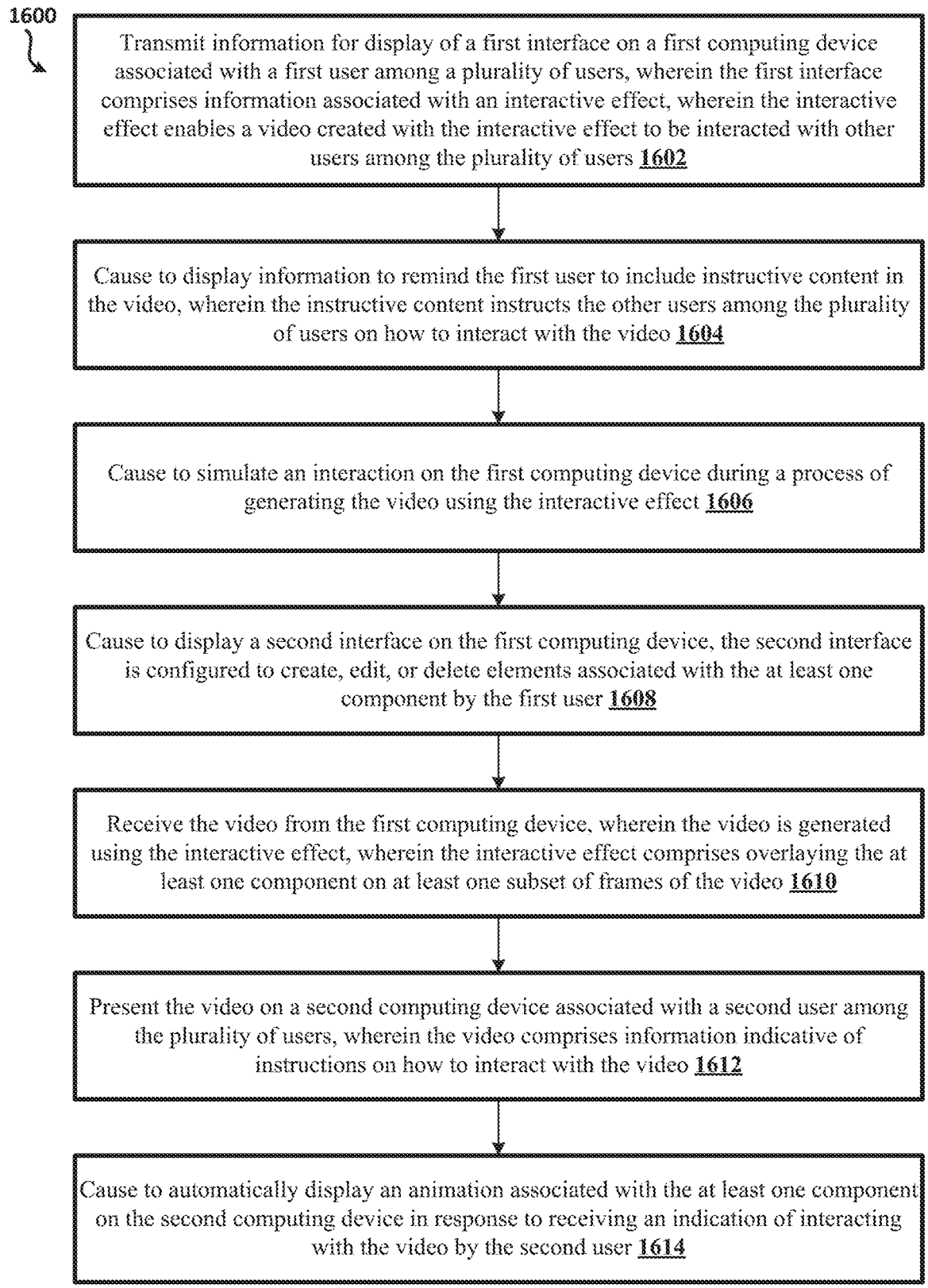
FIG. 16 shows another example method for creating content, which may be performed by a user device in accordance with the present disclosure.

FIG. 16 illustrates an example process 1600 performed by the video service (e.g., video service 112). The video service 112 may perform the process 1600 to increase user interaction with distributed content. Although depicted as a sequence of operations in FIG. 16, those of ordinary skill in the art will appreciate that various embodiments may add, remove, reorder, or modify the depicted operations.

At 1602, information may be transmitted for display of a first interface on a first computing device associated with a first user among a plurality of users. The plurality of users may, for example, be registered users of the video service 112. The first interface comprises information associated with an interactive effect. The interactive effect enables a video created with the interactive effect to be interacted with other users among the plurality of users. The interactive effect may comprise overlaying at least one component on at least one subset of frames of the video. The at least one component may include at least one of a two-dimensional computer-generated graphic or a three-dimensional computer-generated graphic. For example, the at least one component may include the dancing character holding the bottle and glass and/or the bubbles described above. The interactive effect enables the video to be interacted with other users among the plurality of users.

As discussed above, a first user can create a video using an interactive effect selected from a plurality of interactive effects provided by the video service 112. If the user selects an interactive effect that the user wants to create a video with, a prompt may appear on an interface of a first computing device associated with the first user. The prompt may appear, for example, if this is the first time that that this user has created a video using an interactive effect. In embodiments, each interactive effect provided by the video service 112 is associated with its own default background. The first user may be prompted to upload a picture or image to replace the default background. If the user decides that the user wants to upload his or her own picture or image to replace the default background associated with the selected interactive effect, the user may do so. Conversely, if the user decides that the user does not want to replace the default background, the user may not want to upload his or her own picture/image.

At 1604, display of information to remind the first user to include instructive content in the video may be caused. The instructive content instructs the other users among the plurality of users on how to interact with the video. For example, display of a message or instruction may be caused that reminds the first user to verbally instruct viewers on how to interact with the video. For example, the first user may be reminded that, during recording of the video, the first user should verbally instruct viewers to shake, rotate, or perform at least one user gesture (e.g., tap, swipe, click) on an interface of the viewer's computing device.

At 1606, simulation of an interaction may be caused on the first computing device during a process of generating the video using the interactive effect. For example, before the first user actually begins shooting or filming the video, the interaction associated with the interactive effect may be simulated. For example, the interaction that viewers may have with a video that has already been created using the interactive effect may be simulated. In this manner, the first user creating the video will be able to experience the interaction and decide whether they want to create their video using the interactive effect. Text may be displayed on an interface of the first computing device that indicates that viewers of the video will be able to interact with the video as well.

Simulating the interaction may comprise causing display of an indication that includes text and/or graphical instructions that instruct the first user how to interact with the video. For example, the indication may include text that instructs the first user to shake, rotate, or perform at least one user gesture (e.g., tap, swipe, click) on an interface of the first computing device. The interface may also include text or/or graphics that remind the first user that viewers will be able to interact with the video in this same manner. If the user follows the instructions provided by the indication, an animation associated with the at least one component may be caused on the first computing device. In some embodiments, output of a sound may additionally or alternatively be caused if the first user follows the instructions provided by the indication. The sound may correspond to the animation associated with the at least one component.

At 1608, display of a second interface on the first computing device may be caused. The second interface is configured to create, edit, or delete elements associated with the at least one component by the first user. For example, as discussed above with regard to FIG. 9, the first user may be able to erase and/or redraw one or more bubbles that the user has already drawn. At 1610, the video may be received from the first computing device. The received video may have been generated using the interactive effect. For example, the first user may have created the video using the first or second interactive effects described above with regard to FIGS. 4A-13. At 1612, the video may be presented on a second computing device associated with a second user among the plurality of users. For example, output of the video may be caused via the second computing device. The second user may consume or view the video on the second computing device. The video can comprise information indicative of instructions on how to interact with the video. For example, presenting the video on the second computing device may comprise outputting text on an interface of the second computing device. The text may include instructions as to how the second user can interact with the video. For example, the text may instruct the second user to shake or rotated the second computing device. As another example, the text may instruct the second user to perform at least one user gesture (e.g., tap, swipe, click) on an interface of the second computing device.

At 1614, display of an animation associated with the at least one component on the second computing device may be automatically caused in response to an indication of interacting with the video by the second user being received. For example, if the second user follows the instructions (shakes or rotates the second computing device, or performs at least one user gesture), an animation associated with the at least one component may be caused. For example, as described above with regard to FIG. 7B, if the second user shakes the second computing device, the bottle that the 2D character is holding may appear to be popped and/or sprayed. As another example, as described above with regard to FIG. 12B, if the second user taps the screen of the second computing device, the bubbles may appear to be popped or burst.

Figure 17:
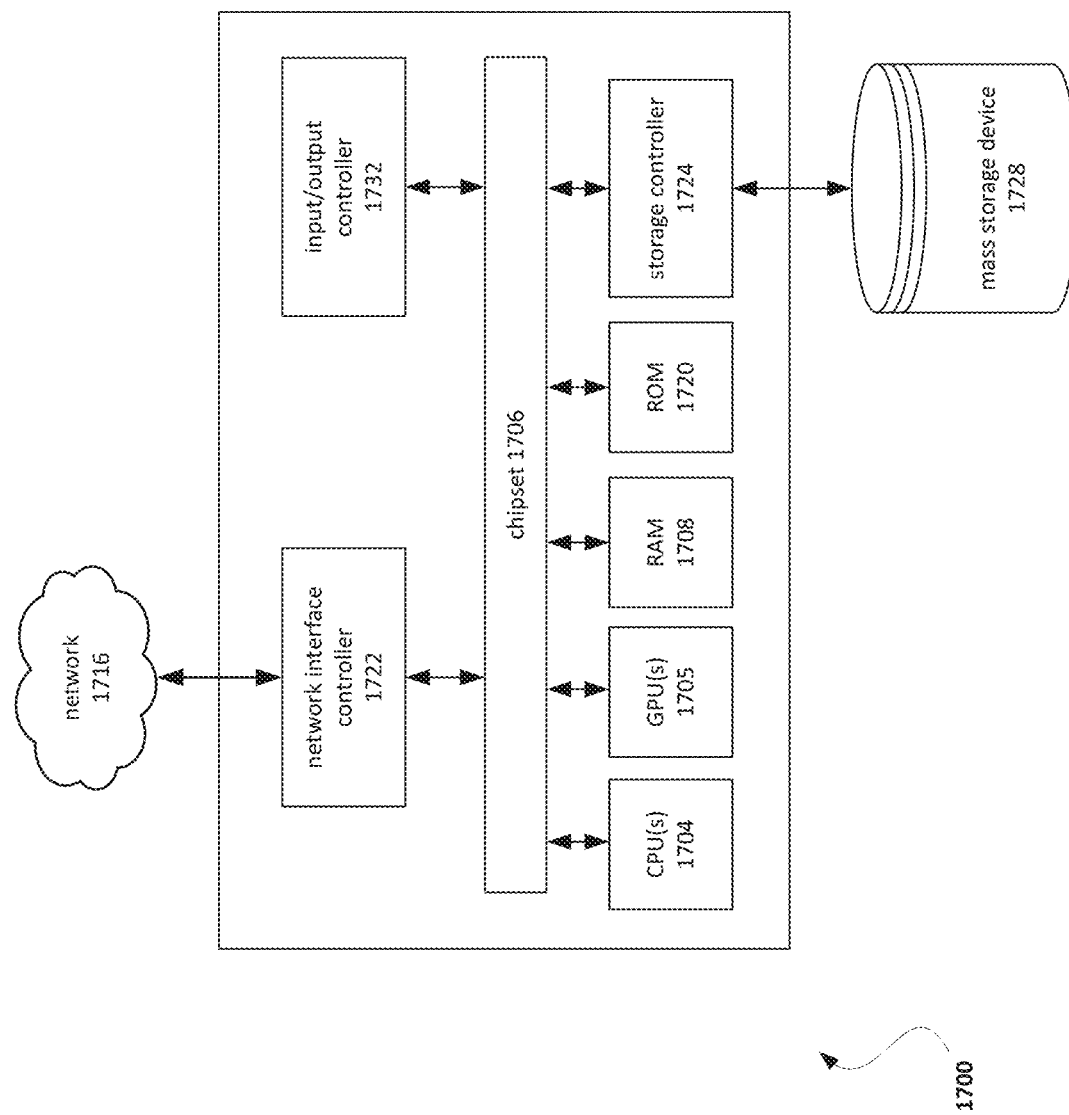
FIG. 17 shows an example computing device which may be used to perform any of the techniques disclosed herein.

FIG. 17 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1700 of FIG. 17. The computer architecture shown in FIG. 17 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1700 may include a baseboard, or "motherboard," which is a printed circuit board to which a multitude of components or devices may be connected by way of a system bus or other electrical communication paths. One or more central processing units (CPUs) 1704 may operate in conjunction with a chipset 1706. The CPU(s) 1704 may be standard programmable processors that perform arithmetic and logical operations necessary for the operation of the computing device 1700.

The CPU(s) 1704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1704 may be augmented with or replaced by other processing units, such as GPU(s). The GPU(s) may comprise processing units specialized for but not necessarily limited to highly parallel computations, such as graphics and other visualization-related processing.

A chipset 1706 may provide an interface between the CPU(s) 1704 and the remainder of the components and devices on the baseboard. The chipset 1706 may provide an interface to a random-access memory (RAM) 1708 used as the main memory in the computing device 1700. The chipset 1706 may further provide an interface to a computer-readable storage medium, such as a read-only memory (ROM) 1720 or non-volatile RAM (NVRAM) (not shown), for storing basic routines that may help to start up the computing device 1700 and to transfer information between the various components and devices. ROM 1720 or NVRAM may also store other software components necessary for the operation of the computing device 1700 in accordance with the aspects described herein.

The computing device 1700 may operate in a networked environment using logical connections to remote computing nodes and computer systems through local area network (LAN). The chipset 1706 may include functionality for providing network connectivity through a network interface controller (NIC) 1722, such as a gigabit Ethernet adapter. A NIC 1722 may be capable of connecting the computing device 1700 to other computing nodes over a network 1716. It should be appreciated that multiple NICs 1722 may be present in the computing device 1700, connecting the computing device to other types of networks and remote computer systems.

The computing device 1700 may be connected to a mass storage device 1728 that provides non-volatile storage for the computer. The mass storage device 1728 may store system programs, application programs, other program modules, and data, which have been described in greater detail herein. The mass storage device 1728 may be connected to the computing device 1700 through a storage controller 1724 connected to the chipset 1706. The mass storage device 1728 may consist of one or more physical storage units. The mass storage device 1728 may comprise a management component 1710. A storage controller 1724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1700 may store data on the mass storage device 1728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1728 is characterized as primary or secondary storage and the like.

For example, the computing device 1700 may store information to the mass storage device 1728 by issuing instructions through a storage controller 1724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1700 may further read information from the mass storage device 1728 by detecting the physical states or characteristics of one or more particular locations within the physical storage units.

In addition to the mass storage device 1728 described above, the computing device 1700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1728 depicted in FIG. 17, may store an operating system utilized to control the operation of the computing device 1700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1728 may store other system or application programs and data utilized by the computing device 1700.

The mass storage device 1728 or other computer-readable storage media may also be encoded with computer-executable instructions, which, when loaded into the computing device 1700, transforms the computing device from a general-purpose computing system into a special-purpose computer capable of implementing the aspects described herein. These computer-executable instructions transform the computing device 1700 by specifying how the CPU(s) 1704 transition between states, as described above. The computing device 1700 may have access to computer-readable storage media storing computer-executable instructions, which, when executed by the computing device 1700, may perform the methods described herein.

A computing device, such as the computing device 1700 depicted in FIG. 17, may also include an input/output controller 1732 for receiving and processing input from a number of input devices, such as a keyboard, a mouse, a touchpad, a touch screen, an electronic stylus, or other type of input device. Similarly, an input/output controller 1732 may provide output to a display, such as a computer monitor, a flat-panel display, a digital projector, a printer, a plotter, or other type of output device. It will be appreciated that the computing device 1700 may not include all of the components shown in FIG. 17, may include other components that are not explicitly shown in FIG. 17, or may utilize an architecture completely different than that shown in FIG. 17.

As described herein, a computing device may be a physical computing device, such as the computing device 1700 of FIG. 17. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
receiving a first video from a first computing device associated with a first user among a plurality of users, wherein the first video is generated using a first interactive effect, the first interactive effect comprises overlaying at least one component on at least one subset of frames of the first video, and the first interactive effect enables the first video to be interacted with other users among the plurality of users;
presenting the first video on a second computing device associated with a second user among the plurality of users, wherein the first video comprises information indicative of instructions on how to interact with the first video; and
causing to automatically display, on the second computing device associated with the second user, an animation of the at least one component associated with the first interactive effect based on which the first video was generated by the first computing device in response to receiving an indication of interacting with the first video by the second user who follows the instructions comprised in the first video, wherein the causing to automatically display an animation associated with the at least one component on the second computing device further comprises:
causing the at least one component to move on an interface of the second computing device, and
causing output of a sound that corresponds to a movement of the at least one component.

2. The method of claim 1, further comprising:
causing to display at least one of predetermined images or predetermined messages subsequent to display of the animation associated with the at least one component.

3. The method of claim 1, further comprising:
transmitting information for display of a first interface on the first computing device, wherein the first interface comprises information associated with the first interactive effect.

4. The method of claim 1, further comprising:
causing to simulate an interaction on the first computing device during a process of generating the first video using the first interactive effect.

5. The method of claim 1, further comprising:
causing to display a second interface on the first computing device, the second interface is configured to create, edit, or delete elements associated with the at least one component by the first user.

6. The method of claim 1, further comprising:
causing to display information to remind the first user to include instructive content in the first video, wherein the instructive content instructs the other users among the plurality of users on how to interact with the first video.

7. The method of claim 1, wherein the at least one component comprises at least one of a two-dimensional computer-generated graphic or a three-dimensional computer-generated graphic.

8. The method of claim 1, wherein the receiving the indication of interacting with the first video by the second users further comprises:
receiving information indicating that the second user has shaken or rotated the second computing device; or
receiving information indicating that the second user has performed at least one user gesture on an interface of the second computing device.

9. The method of claim 1, further comprising:
receiving a second video from the second computing device, wherein the second video is generated using the first interactive effect; and
presenting the second video on a third computing device associated with a third user among the plurality of users, wherein the second video comprises information indicative of instructions on how to interact with the second video.

10. The method of claim 1, wherein the first video is also generated using a second interactive effect, the second interactive effect comprising overlaying at least one other component on at least one other subset of frames of the first video, and wherein the second interactive effect enables the first video to be interacted with the other users among the plurality of users.

11. A system, comprising:
at least one processor in communication with at least one memory, the at least one memory comprising computer-readable instructions that upon execution by the at least one processor cause the at least one processor to perform operations comprising:

receiving a video from a first computing device associated with a first user among a plurality of users, wherein the video is generated using an interactive effect, the interactive effect comprises overlaying at least one component on at least one subset of frames of the video, and the interactive effect enables the video to be interacted with other users among the plurality of users;

presenting the video on a second computing device associated with a second user among the plurality of users, wherein the video comprises information indicative of instructions on how to interact with the video; and causing to automatically display, on the second computing device associated with the second user, an animation of the at least one component associated with the first interactive effect based on which the first video was generated by the first computing device in response to receiving an indication of interacting with the first video by the second user who follows the instructions comprised in the first video, wherein the causing to automatically display an animation associated with the at least one component on the second computing device further comprises:

causing the at least one component to move on an interface of the second computing device, and causing output of a sound that corresponds to a movement of the at least one component.

12. The system of claim 11, the operations further comprising:
causing to display at least one of predetermined images or predetermined messages subsequent to display of the animation associated with the at least one component.

13. The system of claim 11, the operations further comprising:
causing to simulate an interaction on the first computing device during a process of generating the video using the interactive effect.

14. The system of claim 11, the operations further comprising:
causing to display information to remind the first user to include instructive content in the video, wherein the instructive content instructs the other users among the plurality of users on how to interact with the video.

15. A non-transitory computer-readable storage medium, storing computer-readable instructions that upon execution by a processor cause the processor to implement operations comprising:

receiving a video from a first computing device associated with a first user among a plurality of users, wherein the video is generated using an interactive effect, the interactive effect comprises overlaying at least one component on at least one subset of frames of the video, and the interactive effect enables the video to be interacted with other users among the plurality of users;

presenting the video on a second computing device associated with a second user among the plurality of users, wherein the video comprises information indicative of instructions on how to interact with the video;

causing to automatically display, on the second computing device associated with the second user, an animation of the at least one component associated with the first interactive effect based on which the first video was generated by the first computing device in response to receiving an indication of interacting with the first video by the second user who follows the instructions comprised in the first video, wherein the causing to automatically display an animation associated with the at least one component on the second computing device further comprises:

causing the at least one component to move on an interface of the second computing device, and causing output of a sound that corresponds to a movement of the at least one component.

16. The non-transitory computer-readable storage medium of claim 15, the operations further comprising:
causing to display at least one of predetermined images or predetermined messages subsequent to display of the animation associated with the at least one component.

17. The non-transitory computer-readable storage medium of claim 15, the operations further comprising:
causing to simulate an interaction on the first computing device during a process of generating the video using the interactive effect.

18. The non-transitory computer-readable storage medium of claim 15, the operations further comprising:
causing to display information to remind the first user to include instructive content in the video, wherein the instructive content instructs the other users among the plurality of users on how to interact with the video.

* * * * *